US010294862B2

(12) United States Patent
Fulayter et al.

(10) Patent No.: US 10,294,862 B2

(45) Date of Patent: May 21, 2019

(54) TURBINE ENGINE FLOW PATH

(71) Applicant: Rolls-Royce Corporation, Indianapolis, IN (US)

(72) Inventors: Roy David Fulayter, Avon, IN (US); Aaron Joseph King, Greenwood, IN (US); Bronwyn Power, Indianapolis, IN (US); Greg Hebert, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 510 days.

(21) Appl. No.: 14/949,208

(22) Filed: Nov. 23, 2015

(65) Prior Publication Data

US 2017/0145917 A1 May 25, 2017

(51) Int. Cl.

| | |
|---|---|
| ***F02C 7/042*** | (2006.01) |
| ***F01D 5/14*** | (2006.01) |
| ***F01D 5/20*** | (2006.01) |
| ***F01D 5/22*** | (2006.01) |
| ***F01D 1/04*** | (2006.01) |

(52) U.S. Cl.

CPC ................ *F02C 7/042* (2013.01); *F01D 1/04* (2013.01); *F01D 5/143* (2013.01); *F01D 5/20* (2013.01); *F01D 5/225* (2013.01); *F05D 2250/00* (2013.01); *F05D 2250/712* (2013.01); *Y02T 50/673* (2013.01)

(58) Field of Classification Search

CPC ...... F04D 29/685; F04D 29/526; F04D 27/02; F04D 27/547; F01D 5/143; F01D 5/20; F01D 5/225; F01D 1/04

See application file for complete search history.

(56) References Cited

U.S. PATENT DOCUMENTS

| | | | |
|---|---|---|---|
| 3,618,876 | A | 11/1971 | Skidmore et al. |
| 5,145,126 | A | 9/1992 | Patilla |
| 5,177,957 | A | 1/1993 | Grieb |
| 6,106,234 | A | 8/2000 | Gabbitas |
| 6,195,983 | B1 | 3/2001 | Wadia et al. |
| 7,210,905 | B2 | 5/2007 | Lapworth |
| 8,333,076 | B2 | 12/2012 | Conners et al. |
| 8,408,491 | B2 | 4/2013 | Jain et al. |
| 8,622,695 | B2 | 1/2014 | Decker et al. |

(Continued)

FOREIGN PATENT DOCUMENTS

| | | | |
|---|---|---|---|
| EP | 0754864 | A1 | 1/1997 |
| WO | 2015/023325 | A1 | 2/2015 |

OTHER PUBLICATIONS

European Patent Office, Extended European Search Report for corresponding EP Application No. 16194293.3 dated Apr. 18, 2017, 2pgs.

*Primary Examiner* — Jason D Shanske
*Assistant Examiner* — Maxime M Adjagbe
(74) *Attorney, Agent, or Firm* — Duane Morris LLP

(57) ABSTRACT

A turbine engine casing flow-path segment that is locally diffusing, followed by a flow-path segment contracting in the vicinity of a fan blade. This contraction accelerates the fluid flow axially forward of the fan blade leading edge at the tip and converges with the linear flow-path aft of the fan blade leading edge but forward of the fan blade trailing edge. More diffused fluid flow results in increased flow capacity of the fan, and increased fan efficiency.

20 Claims, 8 Drawing Sheets

(56) References Cited

U.S. PATENT DOCUMENTS

| | | | | |
|---|---|---|---|---|
| 8,690,523 | B2 * | 4/2014 | Guemmer | F04D 29/164<br>415/173.1 |
| 8,800,133 | B2 | 8/2014 | Caprario et al. | |
| 8,915,699 | B2 | 12/2014 | Brignole et al. | |
| 8,939,713 | B2 | 1/2015 | Blin et al. | |
| 8,974,177 | B2 | 3/2015 | Atassi | |
| 9,028,208 | B2 | 5/2015 | Zawilinski et al. | |
| 2009/0196739 | A1 | 8/2009 | Tsuchiya | |
| 2014/0301849 | A1 | 10/2014 | Snyder | |

* cited by examiner

TURBINE ENGINE FLOW PATH

FIELD OF THE DISCLOSURE

The present disclosure relates generally to turbine engines, and more specifically to a flow path for a turbine engine.

BACKGROUND

Turbine engines provide energy for a wide range of uses. A typical turbine engine comprises a compressor, a combustor, a high-pressure turbine, and a low-pressure turbine. These components are typically contained within a casing which defines both an internal flow path of air through the engine and the external dimensions of the engine. In some applications, additional components are included to define all or part of the internal flow path.

Examples of turbine engines include turbofan, turbojet, turboshaft, and turboprop engines. In turbofan engines, a fan is typically located forward of the compressor, combustor, and turbines. The fan produces the majority of the engine's thrust during operation. An engine's fuel economy is thus greatly dependent on fan performance. Improvements to fan performance, no matter how slight, can lead to reduced fuel consumption and improved engine efficiency.

BRIEF DESCRIPTION OF THE DRAWINGS

The following will be apparent from elements of the figures, which are provided for illustrative purposes and are not necessarily to scale.

Figure 1:
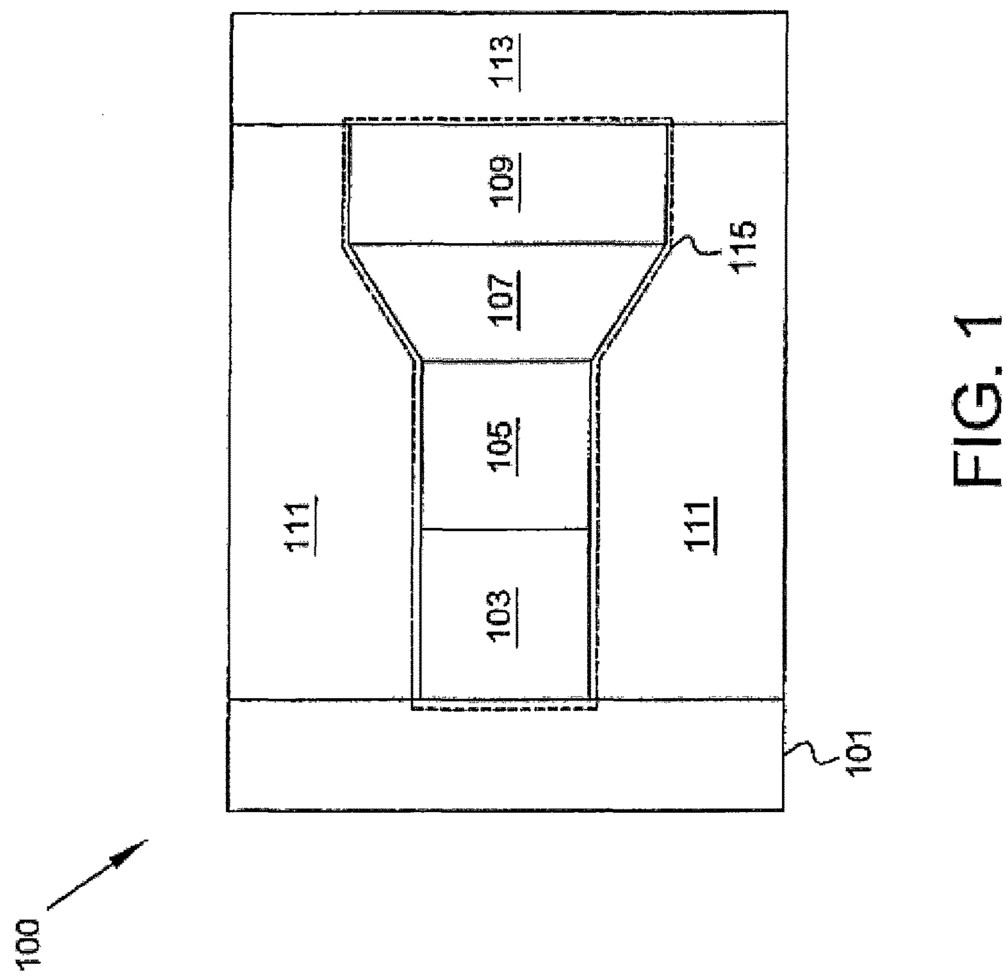
FIG. 1 is a block schematic diagram of a typical turbofan engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

The present disclosure is directed to various embodiments of a turbine engine flow path geometry. Although the present disclosure presents embodiments of flow paths of systems or equipment having rotating blades such as fan blades in a turbofan engine, it would be evident to one of skill in the art that the same or similar flow paths could be used for compressor blades or similar systems employing rotating blades, and indeed for any rotor blade with a high tip relative Mach number.

This disclosure presents embodiments to improve the efficiency of equipment with rotating blades, such as fan blades in a turbofan engine. More specifically, this disclosure is directed to a turbine engine flow path geometry which provides a gain in airflow, efficiency, and surge margin. Detailed descriptions of the disclosed turbine engine flow path geometry, and advantages thereof, are presented below.

FIG. 1 is a block schematic diagram of a typical turbofan engine 100. The turbofan engine 100 comprises an inlet fan 101, a compressor 103, a combustor 105, a high-pressure turbine 107, a low-pressure turbine 109, a bypass region 111, and an exhaust mixing region 113. The inlet fan 101 is mounted to the front of the compressor 103. The engine core 115 is defined as the compressor 103, combustor 105, high-pressure turbine 107, and low-pressure turbine 109.

Air enters the turbofan engine 100 via inlet fan 101. A first portion of the air flows through the bypass region 111 and into the exhaust mixing region 113. A second portion of the air flows into the compressor 103 where it is pressurized, then into the combustor where it is mixed with fuel and ignited. The ratio of the first portion of air flowing through the bypass region 111 to the second portion of air flowing through the engine core 115 is referred to as the bypass ratio.

The hot, high-pressure combustion gasses are directed sequentially into the high-pressure turbine 107 and low-pressure turbine 109, causing each turbine 107, 109 to rotate about a shaft which is connected to and drives the compressor 103 and the inlet fan 101. In multiple-spool designs, more than one concentric shafts are used to separately rotate various components. For example, in a standard two-spool turbofan engine the high-pressure turbine 107 and compressor 103 are connected using a first common shaft while the low-pressure turbine 109 and inlet fan 101 are connected using a second common shaft.

In the turbofan engine 100 presented in FIG. 1, a first portion of thrust is created by the engine 100 is created by the inlet fan 101 sending airflow through the bypass region 111, while a second portion of thrust is created by the exhaust of the engine core 115.

In some embodiments the disclosed turbofan engine 100 can be used to provide power to an aircraft (not illustrated). As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2A:
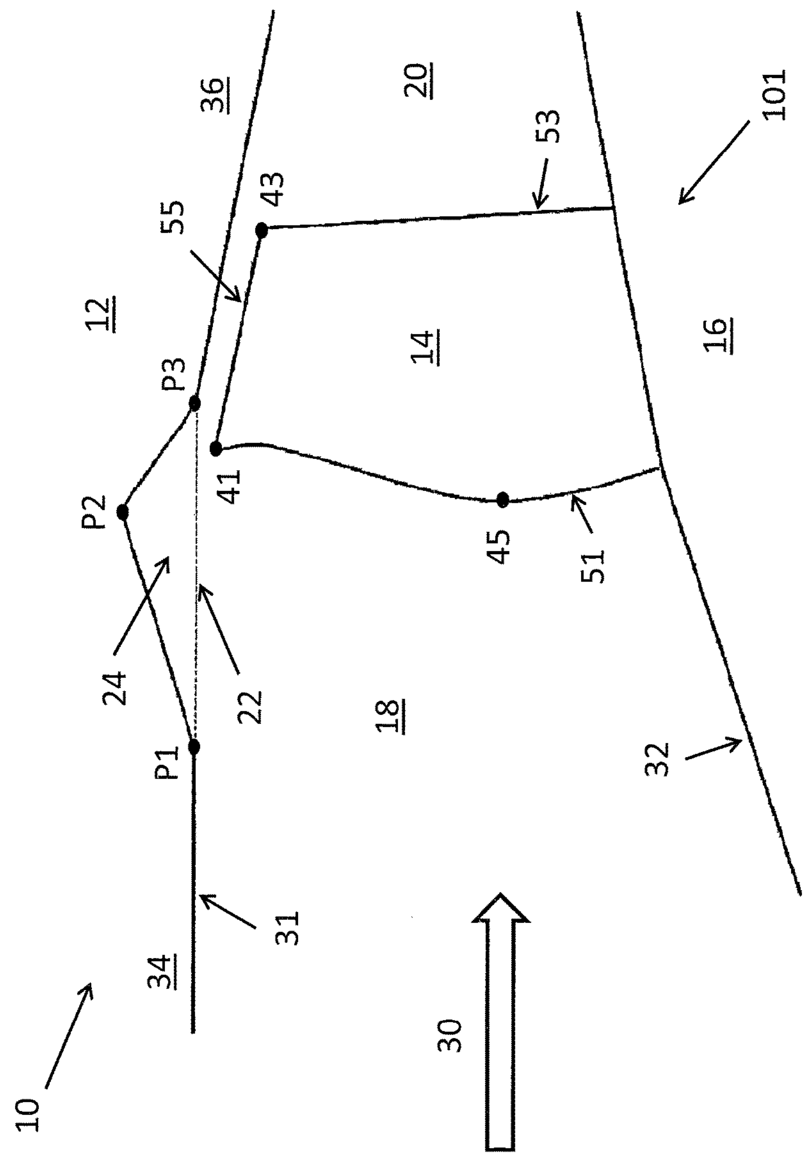
FIG. 2A is a depiction of a turbine engine flow path around an inlet fan in accordance with some embodiments of the present disclosure.

FIG. 2A is a depiction of an turbine engine flow path 10 surrounding an inlet fan 101 in accordance with some embodiments of the present disclosure. Flow path 10 is defined between an inner surface 31 of member 12 and a surface 32 of hub 16. Fluid flow of the working fluid is indicated by arrow 30. The flow path 10 is divided into a forward portion 18 and aft portion 20 which are divided by blade 14. Forward portion 18 may be referred to as an inlet and aft portion 20 may be referred to as an outlet. Blade 14 is one of a plurality of blades connected to hub 16 which together comprise an inlet fan 101. Inlet fan 101 rotates around a centerline (not shown). A dotted line 22 illustrates a typical linear profile of inner surface 31; in the illustrated embodiment, this linear profile is replaced with an annular region 24.

Blade 14 comprises a leading edge 51, a trailing edge 53, a blade tip 55 extending between the leading edge 51 and trailing edge 53, a most forward point 45, a leading tip point 41, and a trailing tip point 43. In some embodiments the axially most forward point 45 is disposed along blade leading edge 51. However, in some embodiments the leading tip point 41 is also the most forward point 45.

In some embodiments blade 14 is one of a plurality of blades comprising a fan. The fan can be a single or multi stage fan. In some embodiments blade 14 is one of a plurality of blades comprising a compressor. The compressor can be a single or multi stage compressor. In some forms the fan stage can be driven by a low pressure spool and the compressor stage can be driven by a higher pressure spool, among any variety of other possibilities. No limitation of the gas turbine engine 100 is hereby intended given the schematic representations illustrated in FIGS. 1, 2A, 2B, or 2C. As will be appreciated, the blade 14 can be one of a plurality of rotating blades and in some embodiments a plurality of stator vanes (not shown) are included. In some embodiments multiple rows of blades and/or multiple rows and stator vanes comprise a turbine component such as a turbine fan or compressor. The stator vanes can be static and/or variable.

Inner surface 31 of member 12 defines the radially-outward boundary of flow path 10, including the boundaries of annular region 24. Annular region 24 is disposed between a cylindrical portion 34 and conical portion 36. The member 12 can take the form of a structural component of the gas turbine engine 100, for example in some applications the structure component is a casing or a shroud of the gas turbine engine 100. In other forms member 12 can be a component used to form a flow path surface that is attached to a structural component of the gas turbine engine 100, or intermediate load transferring component of the gas turbine engine 100. For example, a component used to create a flow path surface can take the form of a liner that is attached to and offset from a casing of the gas turbine engine 100. In some applications the liner can be a fan liner, the casing can be a fan casing or compressor casing, etc. In short, member 12 can take a variety of forms. In some embodiments member 12 is co-axial with the plurality of blades 42. In some embodiments inner surface 31 of member 12 defines a variable diameter annular duct which defines flow path 10.

Moving axially fore to aft, annular region 24 diverges from a typical linear profile of inner surface 31 at point P1, reaches a maximum depth at point P2, and converges with a typical linear profile at point P3. As illustrated in FIG. 2A, annular region 24 can have linear surfaces between point P1 and point P2, and between point P2 and point P3. However, in some embodiments curved surfaces may be used such that annular region 24 assumes a concave shape.

Figure 2B:
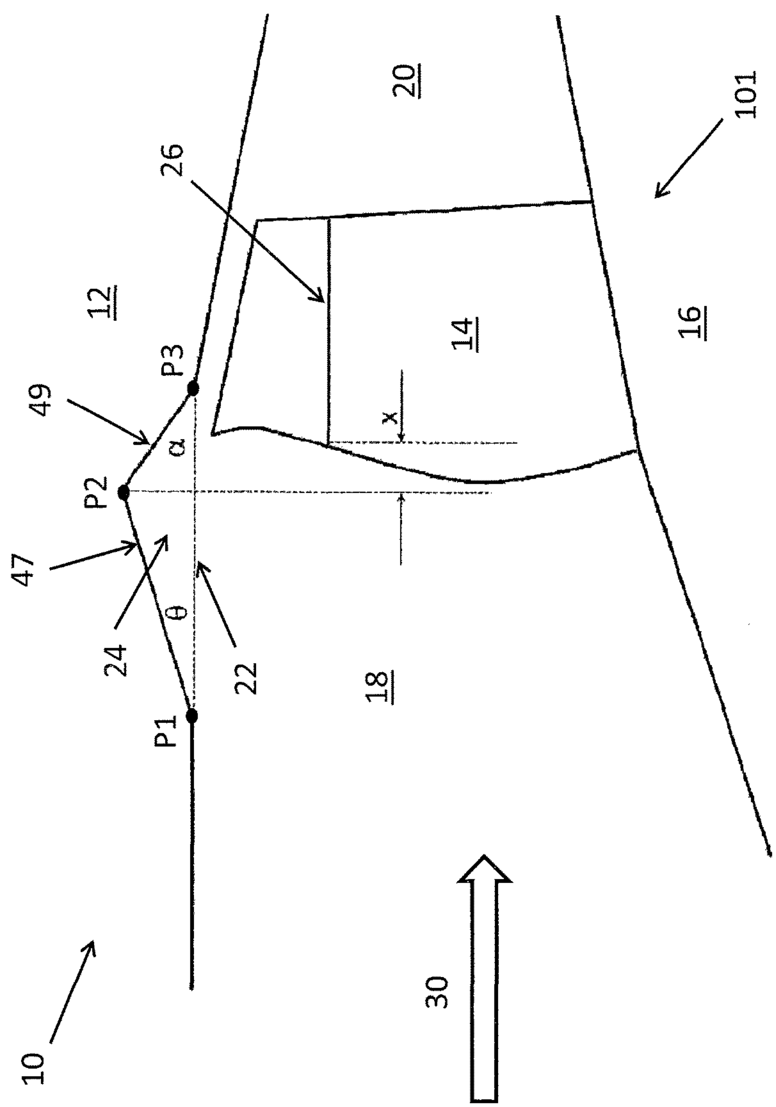
FIG. 2B is a depiction of a turbine engine flow path around an inlet fan in accordance with some embodiments of the present disclosure.

FIG. 2B is a depiction of an turbine engine flow path 10 surrounding an inlet fan 101 in accordance with some embodiments of the present disclosure. As shown in FIG. 2B, annular region 24 is the area between a typical linear profile 22 and the actual inner surface 31 of member 12. In some embodiments, annular region 24 is dimensioned such that the external dimensions of member 12 are not required to be altered, or annular region 24 is dimensioned such that the external dimensions of the turbine engine are not required to be altered.

Annular region 24 is a void bounded by a first surface 47 and a second surface 49. First surface 47 extends between divergent point P1 and maximum deflection point P2, and is disposed at angle $\theta$ to linear profile 22. Second surface 49 extends between maximum deflection point P2 and convergent point P3, and is disposed at angle $\alpha$ to linear profile 22. In some embodiments angle $\theta$ is between 1° and 5°. In some embodiments angle $\alpha$ is between 1° and 5°. In some embodiments, angle $\theta$ and angle $\alpha$ are measured relative to an axis rather than to linear profile 22. For example, in some embodiments angle $\theta$ and angle $\alpha$ are measured relative to the axis of rotation of the plurality of blades 14 or the axis of member 12. In some embodiments angle $\alpha$ is greater than or equal to angle $\theta$.

Figure 2C:
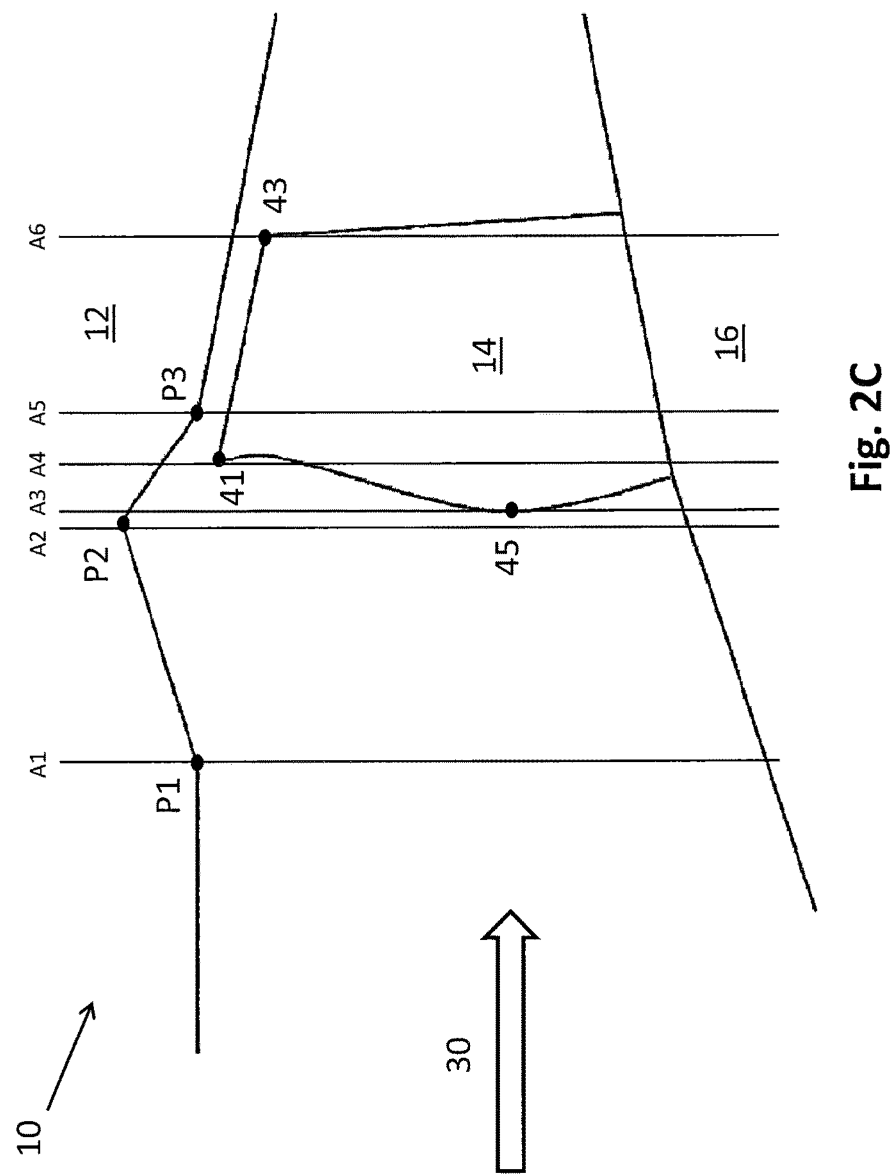
FIG. 2C is a depiction of a turbine engine flow path around an inlet fan in accordance with some embodiments of the present disclosure.

FIG. 2C is a depiction of an turbine engine flow path 10 surrounding an inlet fan 101 in accordance with some embodiments of the present disclosure. FIG. 2C further clarifies the axial alignment of annular region 24 as compared to blade 14. This figure presents six radial lines, A1 through A6, arranged axially forward to axially aft along the illustration.

Line A1 intersects point P1 and shows the axial position of the start of annular region 24 (i.e. the divergent point from a typical linear profile). Line A2 intersects point P2 and shows the axial position of the point of maximum depth of annular region 24. Line A3 intersects the most forward point of blade 14. Line A4 intersects the leading tip point 41 of blade 14. Line A5 intersects point P3 and shows the axial position of the end of annular region 24 (i.e. the convergent point with a typical linear profile). Line A6 intersects the trailing tip of blade 14.

In some embodiment the geometry of member 12 and/or blade 14 is altered to produce a different axial alignment. For example, in some embodiments line A3 and/or line A4 could be forward of line A2 such that the point of maximum depth P2 of annular region 24 is aft of the most forward point of blade 14 and or the leading tip point 41 of blade 14. In some embodiments, the leading tip point 41 of blade 14 could be the most forward point of blade 14, such that line A3 and line A4 were the same. In some embodiments the point of maximum depth P2 of annular region 24 is axially aligned with the most forward point 45 of blade 15 indicated at line A3 and/or with leading tip point 41 of blade 14 indicated at line A4.

Although these geometries are variable, line A1 indicating the start of annular region 24 is generally the most axially forward of the lines. Similarly, line A5 indicating the end of annular region 24 is, in the most efficient geometries, between line A4 and line A6 or between line A3 and line A6. In other words, in the most efficient flow path geometries the annular region 24 ends between either the leading tip point 41 and trailing tip point 43 of blade 14, or between the most forward point 45 and trailing tip point 43 of blade 14.

Figure 2D:
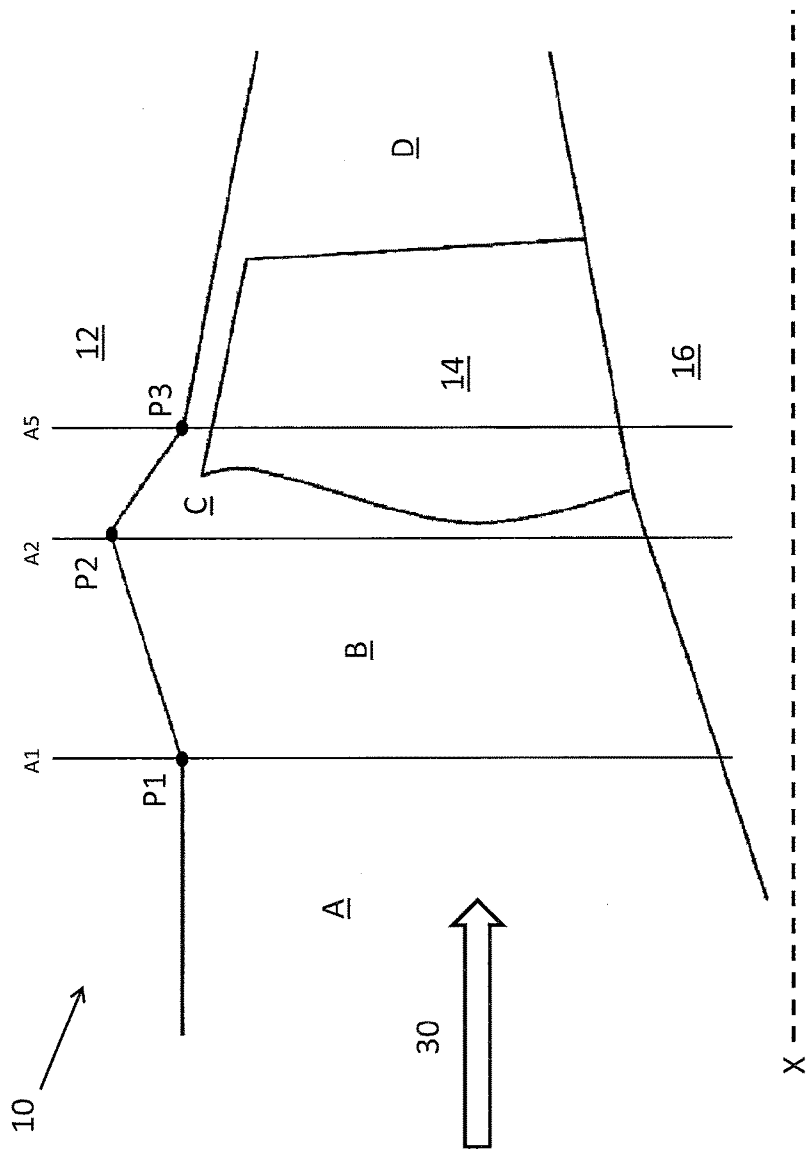
FIG. 2D is a depiction of a turbine engine flow path around an inlet fan in accordance with some embodiments of the present disclosure.

FIG. 2D is a depiction of an turbine engine flow path 10 surrounding an inlet fan 101 in accordance with some embodiments of the present disclosure. As illustrated in FIG. 2D, flow path 10 generally comprises four portions.

A first upstream portion A, or constant portion, is located axially forward of blade 14. First upstream portion A is the annular portion of flow path 10 axially forward of line A1.

In some embodiments first upstream portion A has a constant radial displacement from a reference axis as portion A extends downstream. In some embodiments, the reference axis is the axis of rotation of blades 14 or the axis of member 12.

An expanded portion B is axially downstream from the first upstream portion A and expands flow path 10 as first surface 47 extends between divergent point P1 and maximum deflection point P2. First surface 47 is disposed at angle θ. Expanded portion B is the annular portion of flow path 10 between line A1 and line A2. In some embodiments expanded portion B has a continuously increasing radial displacement from a reference axis as portion B extends downstream. In some embodiments, the reference axis is the axis of rotation of blades 14 or the axis of member 12. In some embodiments expanded portion B is proximate and upstream of blades 14 and terminates axially prior to leading edge 51.

A contraction portion C is axially downstream from expanded portion B. Contraction portion C contracts flow path 10 in the vicinity of blade 14 or leading edge 51 as second surface 49 extends between maximum deflection point P2 and convergent point P3, and is disposed at angle α. Contraction portion C is the annular portion of flow path 10 between line A2 and line A5. In some embodiments contraction portion C has a continuously decreasing radial displacement from a reference axis as portion C extends downstream. In some embodiments, the reference axis is the axis of rotation of blades 14 or the axis of member 12. In some embodiments contraction portion C terminates axially between leading tip point 41 and trailing tip point 43. In some embodiments contraction portion C terminates axially between leading edge 51 and trailing edge 53. In some embodiments contraction portion C begins axially forward of leading edge 51 or leading tip point 41.

Outlet portion D is axially downstream from contraction portion C. Outlet portion D is the annular portion of flow path 10 downstream from line A5.

In some embodiments the radial displacement of constant portion A is approximately equal to the minimum radial displacement of contraction portion C. In some embodiments the radial displacement of constant portion A is less than the maximum radial displacement of expanded portion B.

Annular region 24 causes fluid flow 30 to decelerate, or diffuse, in expanded portion B and then locally accelerate in contraction portion C—in the vicinity of leading tip point 41—which reduces fan blade incidence and enhances the flow capacity of the fan comprising a plurality of blades 14. The enhanced flow capacity improves fan efficiency and increases stall margin.

FIG. 2D further illustrates an axis X. In some embodiments axis X is the axis of rotation of the plurality of blades 14 and hub 16. In some embodiments, axis X is the axis of member 12. In some embodiments, the axis of rotation of blades 14 and hub 16, and the axis of member 12 are the same axis. In still further embodiments axis X is the axis of net fluid flow.

Figure 3:
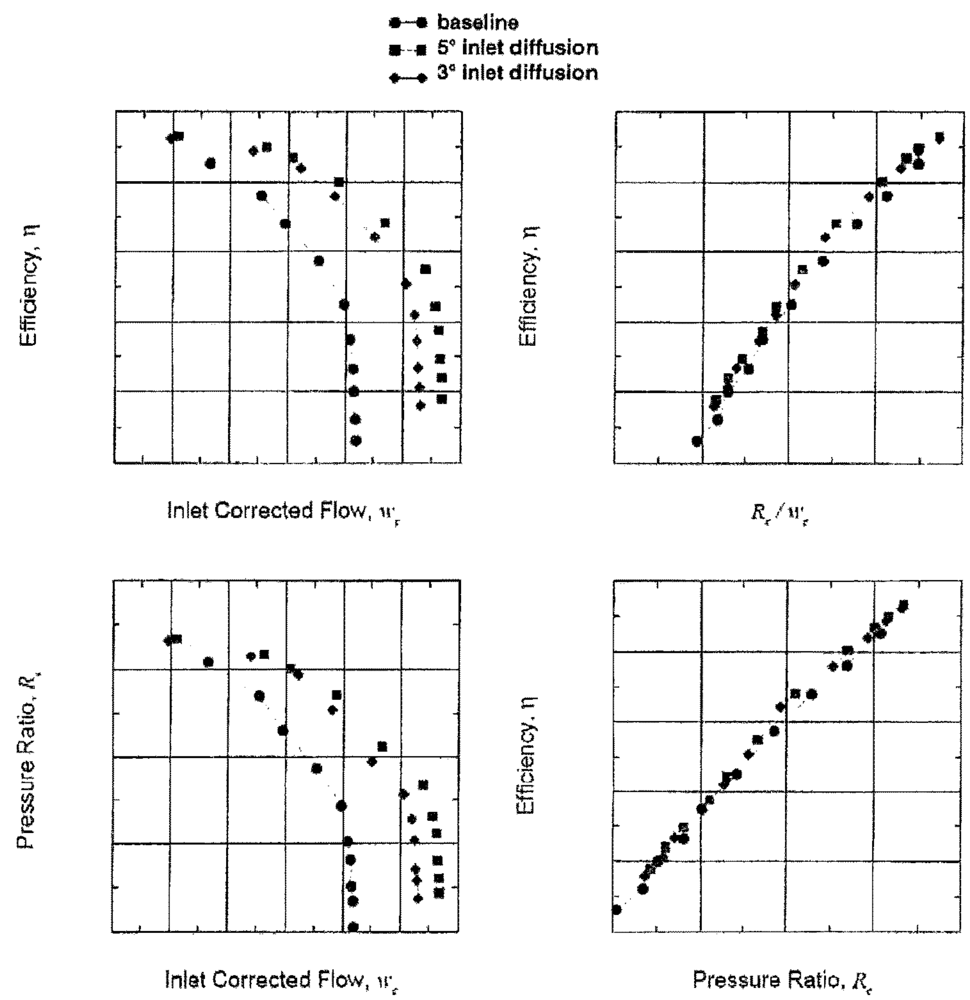
FIG. 3 provides performance graphs based on various turbine engine flow paths around an inlet fan.

FIG. 3 provides several performance graphs based on studies of various contraction and turbine engine flow path geometries. More specifically, FIG. 3 provides graphs of efficiency v. inlet corrected flow, efficiency v. pressure ratio/inlet corrected flow, efficiency v. pressure ratio, and pressure ratio v. inlet corrected flow for three data sets. A first, baseline data set was modeled using the typical linear profile 22 illustrated in FIGS. 2A, 2B, and 2C as dotted line 22. A second data set was modeled with angle θ equal to 3°, and a third data set was modeled with angle θ equal to 5°. The first data set is shown using circle plot points, the second data set is shown using diamond plot points, and the third data set is shown using square plot points.

As seen in FIG. 3, choked flow in the second and third data sets increased between 0.4 and 0.6% over the baseline data set. Efficiency in the second and third data sets increased approximately 0.1% over the baseline data set, while surge margin in the second and third data sets increased 1.6% over the baseline data set. Both the second and third data sets are relatively close in overall performance improvement. Flow for the second data set has the boundary layer attached throughout the extent of the flowpath modification, but the third data set inlet diffusion has a small separation and re-attachment. Results for different engines will vary slightly with spinner area and intake geometry.

Figure 4:
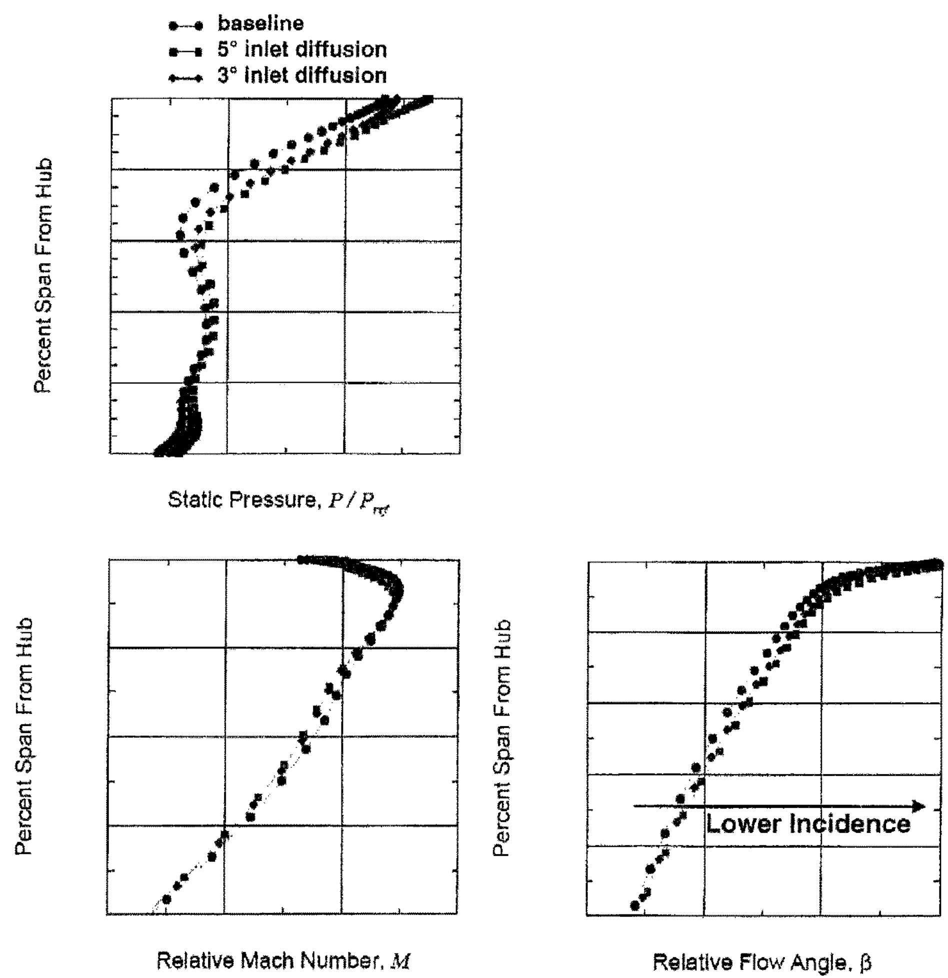
FIG. 4 provides performance graphs based on various turbine engine flow paths around an inlet fan.

FIG. 4 provides several additional performance graphs based on studies of various contraction and turbine engine flow path geometries which illustrate some spanwise flow quantities. More specifically, FIG. 4 provides graphs of percent span from hub v. static pressure, percent span from hub v. relative Mach number, and percent span from hub v. relative flow angle.

The graphs of FIG. 4 show additional endwall diffusion resulting in a mean increase in static pressure at the leading edge of the fan. The reduced static pressure rise across the blade is one mechanism for increasing stall margin of the fan. Another mechanism to increase stall margin is the reduced incidence on the blade. For this example, the incidence is reduced by 1.5°. The relative benefit to stall margin from reduced incidence and higher static pressure at the leading edge will be different from design to design but should give a net benefit to stall margin. This is true not only at tip but also over most of the top half of the blade.

The static pressure rise shown in FIG. 4 indicates a flow velocity decrease. This decrease will result in a lower fan relative Mach number, which will diminish shock strength, resulting in increased fan flow and efficiency. This reduced shock strength includes blade passage shock as well as the oblique shock in front of the blade leading edge. The benefit of diminished shock strength will be larger as relative Mach number increases.

Additional modeling confirmed the importance of the axial alignments discussed above with reference to FIG. 2C. A modified annular region 24 was modeled having convergent point P3 (at line A5) axially forward of the blade leading edge at line A3. The model confirmed that fluid flow diffusion axially forward of the fan blades provided no benefit to fan performance. Diffusion is required in the immediate vicinity of blade 14, and thus the axial alignment described with reference to FIG. 2C is essential. Namely, line A5 indicating the end of annular region 24 is, in the most efficient geometries, between line A4 and line A6 or between line A3 and line A6. In other words, the annular region 24 ends between either the leading tip point 41 and trailing tip point 43 of blade 14, or between the most forward point 45 and trailing tip point 43 of blade 14. This axial alignment ensures that fluid flow diffusions occurs in the immediate vicinity of blade 14. Modeling has shown an annular region 24 having the described axial alignment produces a 0.7% increase in adiabatic efficiency over the baseline model.

Figure 5:
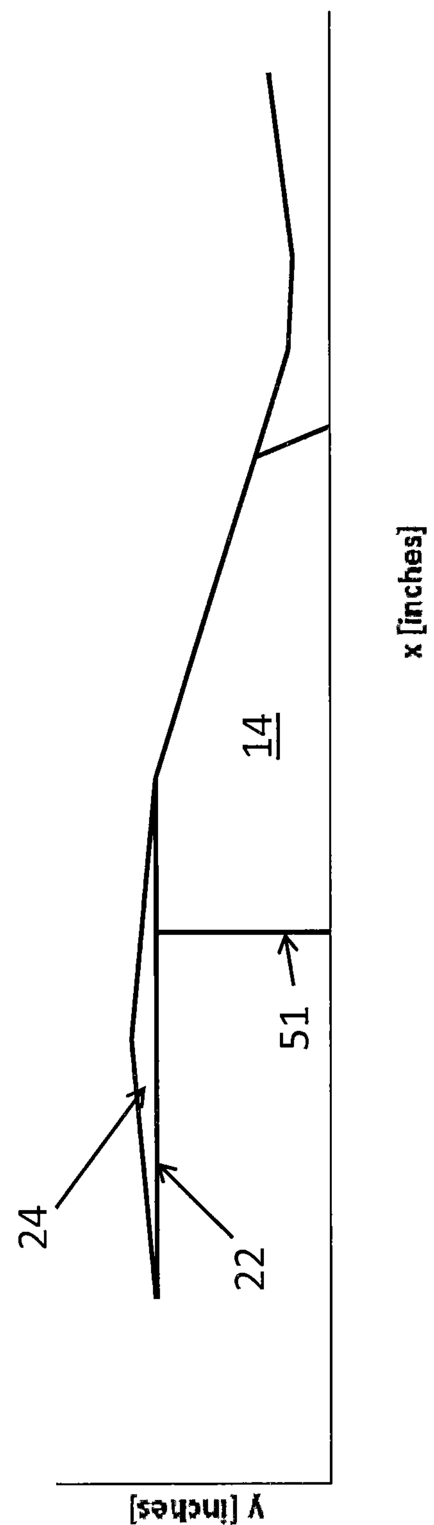
FIG. 5 is a graph of a turbine engine flow path profile around an inlet fan in accordance with some embodiments of the present disclosure.

FIG. 5 is a graph of a turbine engine flow path profile around an inlet fan in accordance with some embodiments of the present disclosure. FIG. 5 shows a blade 14 and a flowpath 10 having an annular region 24 with angle θ and angle α each set to 2.5°. Annular region 24 diverges from the baseline flowpath 22 axially forward of the blade leading edge 51 and converges with the baseline flowpath 22 axially aft of the blade leading edge 51. The graph axes give a perspective of the scale involved in the present disclosure but are by no means limiting on the disclosure.

The disclosed turbine engine flow paths provide numerous advantages over the prior art. As described above, providing an annular region in the turbine engine flow path immediately forward of a plurality of blades causes fluid flow to decelerate, enhancing the fan efficiency. Fluid flow is over-diffused relative to the typical linear profile and then locally accelerated at the fan blade, reducing fan blade incidence. Even small gains in fan efficiency, such as the approximately 0.7% provided by the disclosed flow path, will create significant gains in improved fuel consumption. Further, the disclosed turbine engine flow path having an annular region will guide a blade or plurality of blades during a blade-off casualty event, which improves the effectiveness of the blade-off containment system.

An additional advantage is that the disclosed turbine engine flow paths can be easily integrated into existing engines. For example, the disclosed member 12 can be used to replace existing components defining the flow path, such that the flow path is altered to include the disclosed annular region 24 without additional engine re-design or re-work. The disclosed flow paths additionally reduce development costs for the design of new engines by increasing an engine's thrust capacity, resulting in the elimination of some or all development testing for bird strike, blade off, and similar or associated casualties.

The present application discloses one or more of the features recited in the appended claims and/or the following features which, alone or in any combination, may comprise patentable subject matter.

According to an aspect of the present disclosure, a fluid propulsion system comprises a shroud defining the outer boundary of a flow path, the flow path extending continuously downstream from an inlet of the shroud to an outlet, a plurality of blades oriented radially about an axis within the flow path, wherein the plurality of blades, the shroud and the flow path are coaxial with the axis, each of the blades having a leading edge, a trailing edge, and a blade tip, the blade tip extending from the leading edge downstream to the trailing edge the shroud having a constant portion followed downstream and connected to an expanded portion followed downstream and connected to a contracted portion, the constant portion having a constant radial displacement from the axis as the constant portion extends downstream, the expanded portion having an continuously increasing radial displacement from the axis as the expanded portion extends downstream, and, the contracted portion having a continuously decreasing radial displacement from the axis as the contracting portion extends downstream along the axis, wherein the expanded portion is proximate and upstream of each of the blades and the contracted portion terminates axially between the leading tip point and trailing tip point of the blade tip.

In some embodiments the outer boundary of the flow path at the expanding portion is inclined θ with respect to the axis and the outer boundary of the flow path at the contracting portion is declined α with respect to the axis, wherein α is greater or equal to θ. In some embodiments θ is equal to or less than 5 degrees. In some embodiments θ is equal to or less than 3 degrees. In some embodiments the radial displacement of the constant portion is approximately equal to a minimum radial displacement of the contracted portion and less than a maximum radial displacement of the expanded portion. In some embodiments an upstream end of the contracted portion is upstream of a maximum upstream portion of the leading edge. In some embodiments the contracted portion terminates upstream of a midpoint of the blade tip and downstream of the leading edge of the blade tip. In some embodiments the upstream end of the contracted portion is upstream the leading edge of the blade tip. In some embodiments the upstream end of the contracted portion is downstream of a maximum upstream portion of the leading tip point.

According to an aspect of the present disclosure, a method for increasing stall margin on a rotating fan within a fluid stream, the fluid stream defined by an outer boundary co-axial with a net flow of the stream, the outer boundary having a constant first cross sectional area proximate an inlet, said first cross sectional area being perpendicular to the axis, the method comprises expanding an outer boundary of a fluid stream to a second cross sectional area upstream of the fan and downstream of the inlet, contracting the outer boundary of the fluid stream from the second cross sectional area to a third cross sectional area proximate the fan, wherein the third cross section area is approximately equal the constant first cross sectional area, and wherein the third cross section area is upstream a trailing edge of the fan and downstream of a leading edge of the fan.

In some embodiments the step of expanding comprises providing an annulus inclined θ with respect to the axis and the step of contracting comprises providing a second annulus declined α with respect to the axis, wherein α is greater or equal to θ. In some embodiments θ is equal or less than 5 degrees. In some embodiments θ is equal or less than 3 degrees. In some embodiments the fan comprises a plurality of fan blades oriented radially about the axis, each fan blade comprising a leading edge, trailing edge and blade tip extending from the leading edge to the trailing edge. In some embodiments the second cross sectional area is upstream of a maximum upstream portion of the leading edge of the fan blade. In some embodiments the third cross sectional area is upstream of a midpoint of the blade tip. In some embodiments the second cross sectional area is upstream the leading edge of a blade tip of the fan. In some embodiments the upstream end of the contracted portion is downstream of a maximum upstream portion of the leading edge.

According to an aspect of the present disclosure, a method for increasing the efficiency of a turbofan engine, wherein a fluid stream enters the turbofan through a variable diameter annular duct to a fan, the fluid stream is compressed by a fan, the fan having a plurality of blades, each rotating about an axis, the fluid stream having an outer flow stream immediately adjacent an inner surface of the annular duct and an inner flow stream between the outer flow stream and the axis of the engine, the method comprises expanding the outer flow stream upstream of the fan by increasing the diameter of the inner surface as it extend along the axis proximate and upstream of the fan, compressing the outer flow stream by decreasing the diameter of the inner surface as it extends along the axis proximate the fan; wherein the diameter decreases upstream of a trailing edge of the blade and downstream of a leading edge of a blade tip. In some embodiments the radial distance between the inner surface of the annular duct proximate the leading edge of the blade tip and the leading edge of the blade tip is greater than the radial distance between of the annular duct proximate the trailing edge of the blade tip and the trailing edge of the blade tip.

Although examples are illustrated and described herein, embodiments are nevertheless not limited to the details shown, since various modifications and structural changes may be made therein by those of ordinary skill within the scope and range of equivalents of the claims.

What is claimed is:

1. A fluid propulsion system comprising:

a shroud defining an outer boundary of a flow path, the flow path extending continuously downstream from an inlet of the shroud to an outlet;

a plurality of blades oriented radially about an axis within the flow path, wherein the plurality of blades, the shroud and the flow path are coaxial with the axis, each of the blades having a leading edge, a trailing edge, and a blade tip, the blade tip extending from the leading edge downstream to the trailing edge;

the shroud having a constant portion followed downstream and connected to an expanded portion followed downstream and connected to a contracted portion;

the constant portion having a constant radial displacement from the axis as the constant portion extends downstream;

the expanded portion having a continuously increasing radial displacement from the axis as the expanded portion extends downstream; and, the contracted portion having a continuously decreasing radial displacement from the axis as the contracted portion extends downstream along the axis;

wherein the expanded portion is proximate and upstream of each of the blades and the contracted portion terminates axially between the leading tip point and trailing tip point of the blade tip.

2. The system of claim 1 wherein the outer boundary of the flow path at the expanding portion is inclined $\theta$ with respect to the axis and the outer boundary of the flow path at the contracted portion is declined $\alpha$ with respect to the axis, wherein $\alpha$ is greater or equal to $\theta$.

3. The system of claim 2 wherein $\theta$ is equal to or less than 5 degrees.

4. The system of claim 3 wherein $\theta$ is equal to or less than 3 degrees.

5. The system of claim 1 wherein the radial displacement of the constant portion is approximately equal to a minimum radial displacement of the contracted portion and less than a maximum radial displacement of the expanded portion.

6. The system of claim 1 wherein an upstream end of the contracted portion is upstream of a maximum upstream portion of the leading edge.

7. The system of claim 1 wherein the contracted portion terminates upstream of a midpoint of the blade tip and downstream of the leading edge of the blade tip.

8. The system of claim 1 wherein the upstream end of the contracted portion is upstream of the leading edge of the blade tip.

9. The system of claim 1 wherein the upstream end of the contracted portion is downstream of a maximum upstream portion of the leading tip point.

10. A method for increasing stall margin on a rotating fan within a fluid stream, the fluid stream defined by an outer boundary co-axial with a net flow of the stream, the outer boundary having a constant first cross sectional area proximate an inlet, said first cross sectional area being perpendicular to an axis, comprising:

continuously expanding in a downstream direction a portion of the outer boundary of a fluid stream to a second cross sectional area upstream of the fan and downstream of the inlet;

contracting the outer boundary of the fluid stream from the second cross sectional area to a third cross sectional area proximate the fan, wherein the third cross sectional area is approximately equal to the constant first cross sectional area, and wherein the third cross sectional area is upstream of a trailing edge of the fan and downstream of a leading edge of the fan.

11. The method of claim 10 wherein the step of expanding comprises providing an annulus inclined $\theta$ with respect to the axis and the step of contracting comprises providing a second annulus declined $\alpha$ with respect to the axis, wherein $\alpha$ is greater or equal to $\theta$.

12. The method of claim 11 wherein $\theta$ is equal or less than 5 degrees.

13. The method of claim 12 wherein $\theta$ is equal or less than 3 degrees.

14. The method of claim 10 wherein the fan comprises a plurality of fan blades oriented radially about the axis, each fan blade comprising a leading edge, trailing edge and a blade tip extending from the leading edge to the trailing edge.

15. The method of claim 14 wherein the second cross sectional area is upstream of a maximum upstream portion of the leading edge of the fan blade.

16. The method of claim 14 wherein the third cross sectional area is upstream of a midpoint of the blade tip.

17. The method of claim 14 wherein the second cross sectional area is upstream the leading edge of the blade tip of the fan.

18. The method of claim 14 wherein the upstream end of the contracted portion is downstream of a maximum upstream portion of the leading edge.

19. A method for increasing the efficiency of a turbofan engine, wherein a fluid stream enters the turbofan engine through a variable diameter annular duct to a fan, the fluid stream is compressed by the fan, the fan having a plurality of blades, each rotating about an axis, the fluid stream having an outer flow stream immediately adjacent an inner surface of the annular duct and an inner flow stream between the outer flow stream and the axis of the turbofan engine, comprising:

continuously expanding the outer flow stream as it proceeds downstream, upstream of the fan by increasing the diameter of the inner surface as it extends along the axis proximate and upstream of the fan;

compressing the outer flow stream by decreasing the diameter of the inner surface as it extends along the axis proximate the fan; wherein the diameter decreases upstream of a trailing edge of the blade and downstream of a leading edge of a blade tip.

20. The method of claim 19 wherein the radial distance between the inner surface of the annular duct proximate the leading edge of the blade tip and the leading edge of the blade tip is greater than the radial distance between the annular duct proximate the trailing edge of the blade tip and the trailing edge of the blade tip.

* * * * *